(Model.)

H. CASLER.
PHOTOGRAPHIC CAMERA SHUTTER.

No. 509,841. Patented Nov. 28, 1893.

WITNESSES:
H. A. Carhart,
D. May Goodrich.

INVENTOR
Herman Casler
By Smith & Denison
ATTORNEYS.

UNITED STATES PATENT OFFICE.

HERMAN CASLER, OF SYRACUSE, NEW YORK, ASSIGNOR OF ONE-HALF TO HARRY N. MARVIN, OF SAME PLACE.

PHOTOGRAPHIC-CAMERA SHUTTER.

SPECIFICATION forming part of Letters Patent No. 509,841, dated November 28, 1893.

Application filed March 1, 1893. Serial No. 464,161. (Model.)

*To all whom it may concern:*

Be it known that I, HERMAN CASLER, of Syracuse, in the county of Onondaga, in the State of New York, have invented new and useful Improvements in Camera-Shutters, of which the following, taken in connection with the accompanying drawings, is a full, clear, and exact description.

My invention relates to cameras and particularly to that class which is known as detective cameras.

My object is to produce a small camera, which will occupy about the same space as an ordinary watch; inexpensive in its construction and of great utility; and to that end my invention consists in the several new and novel combinations of parts hereinafter described and specifically set forth in the claims hereunto annexed. It is constructed as follows, reference being had to the accompanying drawings, in which—

Figure 1:
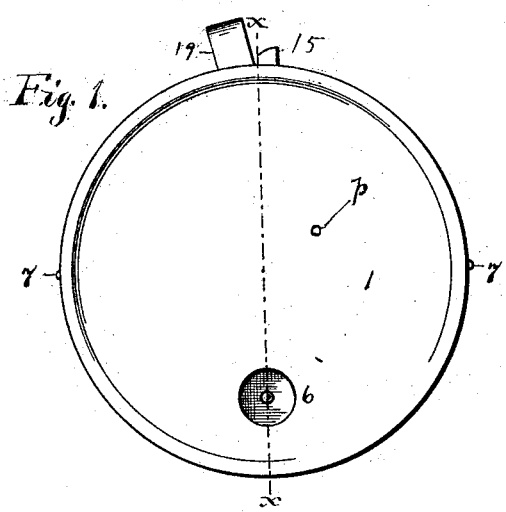
Figure 4:
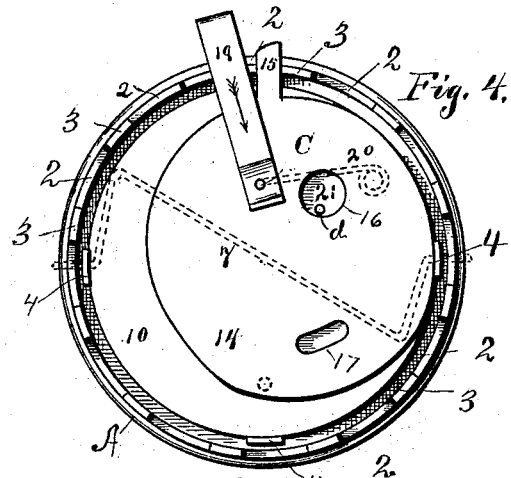
Figure 5:
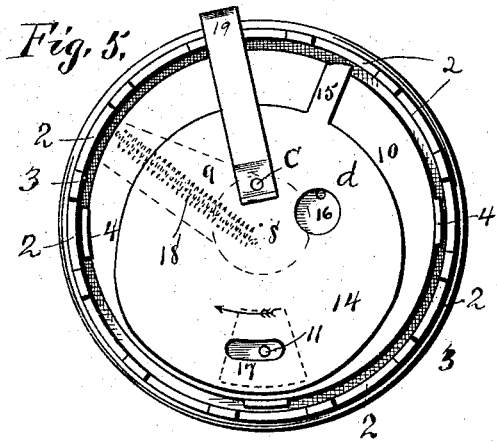
Figure 6:
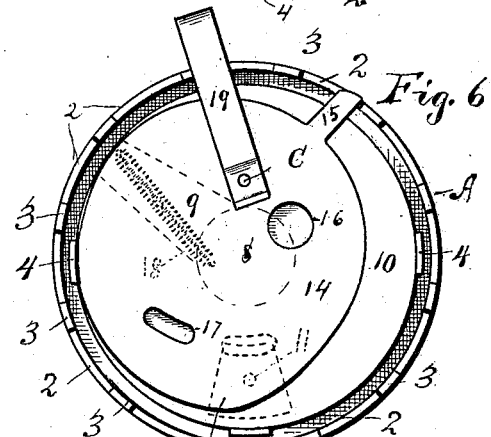
Figure 7:
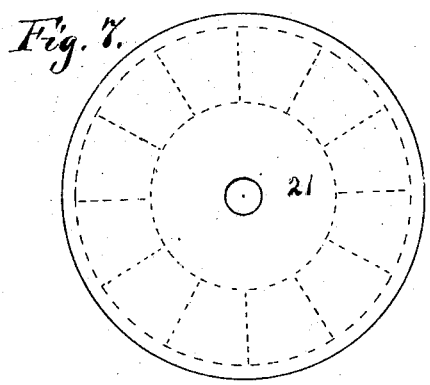
Figures 2, 3:
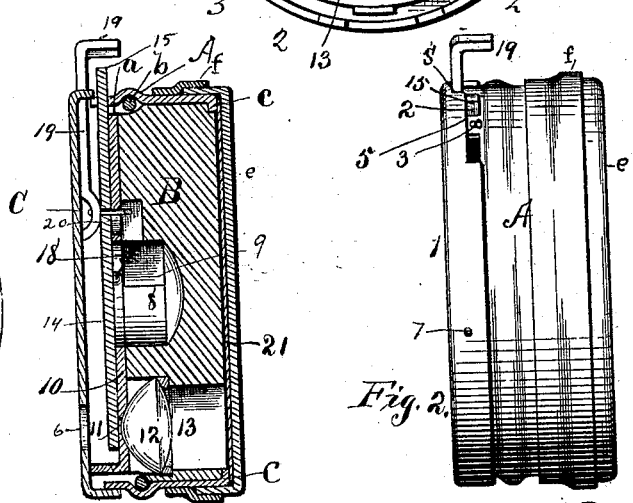

Figure 1, is a front view of the camera. Fig. 2, is an edge view thereof. Fig. 3, is a section on line $x\ x$, Fig. 1. Fig. 4, is a front view of the camera, with the front case removed, the parts being in position ready for the exposure. Fig. 5, is a view of the shutter as it travels across the base at the instant of exposure. Fig. 6, is a similar view showing the position of the parts after the exposure has been made. Fig. 7, is a view of the film.

The letter A indicates an outer casing or shell having arranged around one of its edges, at regular intervals, a series of open slots or recesses, 2, and a series of projections, 3, each slot or recess alternating with a projection. The projections are numbered consecutively, in this particular instance being numbered from one to twelve, the purpose of which will be hereinafter explained. The other edge of the casing or shell is turned inwardly to form an annular flange, c, which serves as a seat for the body B on one side and for the film on the other side. The shell or casing is also provided with a front or face cap 1, and a rear cap, e. The front cap is provided in its flange-part with a shallow open slot or recess, 5, and a deeper recessed slot, s, and in its face with an exposure opening 6.

The body or base B is constructed of suitable material such as aluminum, wood, or cork, and is fitted loosely within the casing or shell. The said body is provided, at diametrically opposite sides with extensions or lugs 4, which are apertured to receive the ends of a Z-shape spring 7. The ends of said spring also pass through corresponding apertures in the flange of the front cap, and serve to hold said cap against displacement.

The body or base, in its front or face side, is provided with a central recess, 8, having a slot-way, 9, opening from it and extending to the periphery of said body or base, as shown by the dotted lines in Figs. 5 and 6. Near the edge, at the lower part of the body or base, is an opening, 13, in which is seated the usual lens 12, and in an annular groove or rabbet, a, is seated a spring 6, (shown in Fig. 3,) which serves as a friction washer or binder to maintain the body or base in proper position within the casing or shell, thus rendering it unnecessary to construct said body or base to snugly fit said casing or shell, which is objectionable as the base is liable to vary in diameter, both in the manufacture and by the action of the atmosphere. By the use of this washer I am enabled to construct the body or base of slightly less diameter than that of the casing or shell, as the tension of the spring washer is sufficient to hold it on its seat within the casing.

To the body or base is attached the operative parts of my improved shutter mechanism.

Upon the front or face side of the body or base is secured a plate 10, having an aperture 11, directly opposite the lens, and a central aperture corresponding with the recess 8 in the base or body. Upon the plate 10 is fixed a shutter, 14, which is held in operative position by two springs 18 and 20. One end of the spring 18 is attached to the shutter at its center and the other end passing through the central aperture in plate 10, and through the slot-way 9, in the body or base, is attached at a point near the periphery of said base. The other spring, 20, is located between the body and plate 10, in a slot-way made in the front or face side of said body and has an upturned end C which passes through the plate 10 and shutter 14 and projects a short distance above the face of said shutter, said upturned end serving as a pivot for the shutter and as a post on which to pivot an operating lever 19, which lever serves as a push button to operate the shutter. The shutter is provided with an exposure slotway, 17, and an aperture 16, the purpose of which will presently appear. The shutter is also provided with a lug or projection, 15, which is adapted to operate in the slots or recesses 5 and 2 and has one of its corners slightly rounded, so that it may readily slip under the projections 3 and into the adjacent slot or recess 2, when the shutter is operated. The lever 19 is pivoted at its inner end on the upturned end C of the spring 20, and, extending outward through the slot s in the flange of the face cap, serves as a push-button to operate the shutter in making an exposure. The film 21 is placed within the rear cap or cover, between it and the body or base, with its outer edges resting upon the inwardly turned flange of the shell or casing, in which position it is impinged between said flange and cover, so that when the casing or shell and rear cover are turned in making continued exposures the film is also turned. The film is divided into as many sections as there are numbered projections on the casing or shell, thus enabling the operative in the present case to make twelve exposures with one film. It will be understood that the number of pictures taken on one film varies according to the size of the camera and the picture desired.

A rubber band or elastic f is slipped over the rear flanged-cap and the casing for the purpose of excluding light from the film chamber or apartment. To make an exposure the various parts will occupy the position shown in Fig. 4, with the face or front cap in position. By simply pushing in lever 19 an instantaneous exposure is obtained. As the lever is pushed in the shutter is caused to move downward until the lug or projection 15 is withdrawn from the slot 2 in the flange of the cap (see Fig. 5,) when the tension of the spring 18 will immediately draw the shutter aside closing the exposure opening in plate 10. (See Fig. 6.) At the instant lug 15 is withdrawn from the slot 3 in the said flange the slotway exposure of the shutter registers with the exposure aperture of the plate 10, but only for an instant, as the shutter is immediately drawn aside, as before stated, by the action of spring 18, spring 20 resetting the shutter when the next turn of the casing or shell is made.

After an exposure has been made the several parts will assume the position shown in Fig. 6. To reset them for another exposure, the camera is placed in the right hand, the thumb and fingers firmly grasping the shell and rear cover, and with the left hand the flanged front cap is slightly rotated; or the camera may be taken in the left hand with the fingers and thumb tightly clasping the front flanged-cap, and with the right hand rotate the casing and rear cap. In either case the rotation continues until the lug 15 strikes against a lug L which supports the free end of the lever 19, when the parts are again in the position shown in Fig. 4, ready for another exposure.

To make a time exposure, I provide the plate 10 with a perforation, d, much smaller than the aperture 16 in the shutter, and in the face cap I make an aperture, p, corresponding in size and registering with the perforation d in the plate 10. Before pressing the operating-lever or push-button I insert a pin through the aperture p and push it down through the larger aperture 16 and into the perforation d, thus limiting the movement of the shutter within the aperture 16, whose side wall contacts with the pin and permits the shutter to be held with its exposure-slot-way registering with the exposure-aperture in plate 10 so long as the operating lever is held pushed in. As soon as the operating lever is released the spring 18 draws aside the shutter sufficiently to close the exposure aperture in plate 10.

It will readily be understood that as the film is impinged between the inwardly turned flange c, and the rear cap it will move in unison with the shell and said cap; when the latter or the front cap is turned to reset the parts for another exposure, thus bringing new portions of the film under the exposure opening 13.

The rubber band f affords a firm grasping surface for the hand either in holding or rotating the shell and rear cap, and it will be understood that when said shell and cap are rotated the body or base remains stationary with the front cap to which it is attached by the spring 7.

What I claim as my invention, and desire to secure by Letters Patent, is—

1. A camera-shutter mechanism comprising a shutter mounted on a moving pivot and arranged to travel in a circuitous direction in making an exposure, substantially as specified.

2. A camera-shutter pivotally mounted on a movable spring and adapted to move in a circuitous direction, in combination with a spring secured at its respective ends to said shutter and the shutter-support or base, whereby the shutter is partially rotated to carry its exposure opening over the exposure opening of the camera, substantially as specified.

3. A camera-shutter mechanism comprising a shutter mounted on a moving pivot, a spring connecting said shutter with the shutter-support or base and serving to partially rotate the shutter, and an operating lever, substantially as specified.

4. A rotary moving camera-shutter mounted on a moving pivot and provided with a lug to engage or to be engaged by recesses in the casing or shell of a camera, in combination with a spring serving to partially rotate said shutter, and means for operating the shutter to make an exposure, substantially as specified.

5. A rotary moving camera-shutter mounted on a moving pivot and provided with a lug to engage or to be engaged by recesses in the casing or shell of a camera, in combination with a spring serving to partially rotate said shutter, and a push-lever pivoted on the moving pivot, substantially as specified.

6. A rotary moving camera-shutter mounted on a moving pivot and provided with a lug engaging with recesses in the casing or shell of a camera, in combination with a spring connecting said shutter with its support or base, a push-lever, and means for resetting the shutter, substantially as specified.

7. A rotary moving camera-shutter mounted on a moving pivot and provided with a lug engaging with recesses in the casing or shell of a camera in combination with a spring-connection between said shutter and its base, a push-lever operating the shutter in making an exposure and a cover for said shutter having an exposure opening and adapted to be rotated to reset the shutter, substantially as specified.

8. In a camera-shutter, the combination with a support or base for the shutter mechanism, of a shutter supported on a movable pivot and having a rotary movement, a cover or cap having an exposure-opening, and a spring securing said cover or cap to said base or support, whereby the cover or cap may be rotated to bring an unexposed portion of a film opposite the exposure-opening in the base or support, substantially as specified.

9. In a camera-shutter mechanism, the combination, with a base or support for the shutter, of a shutter mounted on a movable pivot and having an oscillatory movement, a spring securing said shutter to said base, and a hole in the base adapted to receive a pin passed through an opening in the shutter, whereby the movement of said shutter may be arrested for time exposures, substantially as specified.

In witness whereof I have hereunto set my hand this 13th day of February, 1893.

H. CASLER.

In presence of—
H. A. CARHART,
HOWARD P. DENISON.